(12) United States Patent
Lambert et al.

(10) Patent No.: US 9,805,335 B2
(45) Date of Patent: Oct. 31, 2017

(54) DISTRIBUTED ENTERPRISE EQUIPMENT INVENTORY LOCATION SYSTEM

(71) Applicant: Dell Products L.P., Round Rock, TX (US)

(72) Inventors: Timothy M. Lambert, Austin, TX (US); Dinesh Kunnathur Ragupathi, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 21 days.

(21) Appl. No.: 14/510,435

(22) Filed: Oct. 9, 2014

(65) Prior Publication Data

US 2016/0104101 A1 Apr. 14, 2016

(51) Int. Cl.
*G06Q 10/00* (2012.01)
*G06F 17/30* (2006.01)
*G06Q 10/08* (2012.01)

(52) U.S. Cl.
CPC .................................. *G06Q 10/087* (2013.01)

(58) Field of Classification Search
CPC .... G06Q 10/087; G06Q 20/203; G06Q 30/00; G06F 17/30
USPC .............................. 705/28; 235/385; 715/781
See application file for complete search history.

(56) References Cited

U.S. PATENT DOCUMENTS

| | | | | |
|---|---|---|---|---|
| 2002/0082120 | A1* | 6/2002 | McLaughlin | A63B 24/0021 473/353 |
| 2004/0002998 | A1* | 1/2004 | Takahashi | G06F 17/30525 |
| 2004/0121822 | A1* | 6/2004 | Kartchner | 455/574 |
| 2006/0106652 | A1* | 5/2006 | Wamsley | 705/4 |
| 2007/0138273 | A1* | 6/2007 | Saperstein et al. | 235/385 |
| 2007/0138274 | A1* | 6/2007 | Saperstein et al. | 235/385 |
| 2008/0099557 | A1* | 5/2008 | James | 235/385 |
| 2009/0230191 | A1* | 9/2009 | Saperstein | 235/385 |
| 2011/0055733 | A1* | 3/2011 | Hamilton, II | A63F 13/10 715/757 |
| 2011/0061018 | A1* | 3/2011 | Piratla | G06F 17/30241 715/781 |
| 2012/0052879 | A1* | 3/2012 | Wildon et al. | 455/456.1 |
| 2012/0087301 | A1* | 4/2012 | Brandt et al. | 370/328 |
| 2012/0218103 | A1* | 8/2012 | Alves | G08B 21/24 340/539.32 |
| 2013/0328661 | A1* | 12/2013 | Phillips | G06K 9/00771 340/5.7 |

* cited by examiner

*Primary Examiner* — Seye Iwarere
(74) *Attorney, Agent, or Firm* — Terrile, Cannatti, Chambers & Holland, LLP; Stephen A. Terrile (57) ABSTRACT

Management controller awareness and cooperation between nodes within an IT environment are used to provide a secure, optional and altruistic system to identify environment inventory. Such a system minimizes a management controller compute overhead, network burden via an optimized search space and provides an opportunistic scheduled time for response.

14 Claims, 4 Drawing Sheets

DISTRIBUTED ENTERPRISE EQUIPMENT INVENTORY LOCATION SYSTEM

BACKGROUND OF THE INVENTION

Field of the Invention

The present invention relates to information handling systems. More specifically, embodiments of the invention relate to information handling systems implementing a distributed enterprise equipment location system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling systems is when a plurality of information handling systems are contained within a distributed enterprise environment. With such an environment it is desirable to be able to locate equipment (including information handling systems as well as components contained within or associated with information handling systems) within the environment. It is known to provide individual information technology (IT) equipment such as server type information handling systems with a lifecycle controller. Such a lifecycle controller can log detailed hardware inventory changes for that server. In large IT equipment environments (such as data centers or labs), it is common when accessing an information handling system within the environment to know that an entity (i.e., a piece of hardware contained within an information handling system) has been installed or removed. However, it is often difficult to determine whether the entity is new to the environment or was moved or migrated between different information handling systems in the environment. One example of when an entity is moved between different information handling systems occurs when an entity is "borrowed" from a nearby machine. Additionally, various emerging use cases include management controller awareness and cooperation between nodes in a chassis or across chassis. For example, it is known to use remote console capabilities to retrieve lifecycle logs and current inventory.

Accordingly, it would be desirable to provide a peer-to-peer means for retrieving lifecycle logs and current inventory. It would also be desirable to provide a system that allows a user driven request for lost inventory and a management controller's ability to receive the request, schedule and efficiently search applicable current or past inventory and notify the requester if a find occurs, as well as any associated reactions based on severity.

SUMMARY OF THE INVENTION

In accordance with the present invention, management controller awareness and cooperation between nodes within an IT environment are used to provide a secure, optional and altruistic ability to identify environment inventory. Such a system minimizes a management controller compute overhead, network burden via an optimized search space and provides an opportunistic scheduled time for response.

More specifically, a system, method, and computer-readable medium are disclosed for providing registration to a non-volatile space providing inventory devices with history rotation scheme (e.g., current location and most recent different location). In the subset of commodities without that ability to write non-volatile current/past location information, any available unique information from the device is processed via a Lifecycle log (such commodities may miss out on the location capability). Additionally, in certain embodiments, the system further comprises a device which maintains current and last location (e.g., in certain embodiments, this information comprises some or all of a chassis name, a service tag, a sled number, a slot number, etc.). In certain embodiments, the system enables a user the ability to determine a specific lost device, severity of loss (informational vs critical), query other boxes (e.g., with a time frame that the device was lost) across a management network to determine a current location of very specific devices. Additionally, in certain embodiments, the system provides a baseboard management controller (BMC) or chassis management controller (CMC) with the ability to receive and process a lost request, to limit the search to the timeframe since lost, to schedule a current inventory and past inventory LC log search in a convenient timeframe, to determine a match via looking at current and past possession as well as correlating the possession with the previous owner's information and on a hit, based on severity, react accordingly. If a found response reaches the lost source, then the system logs the information and notifies an administrator.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
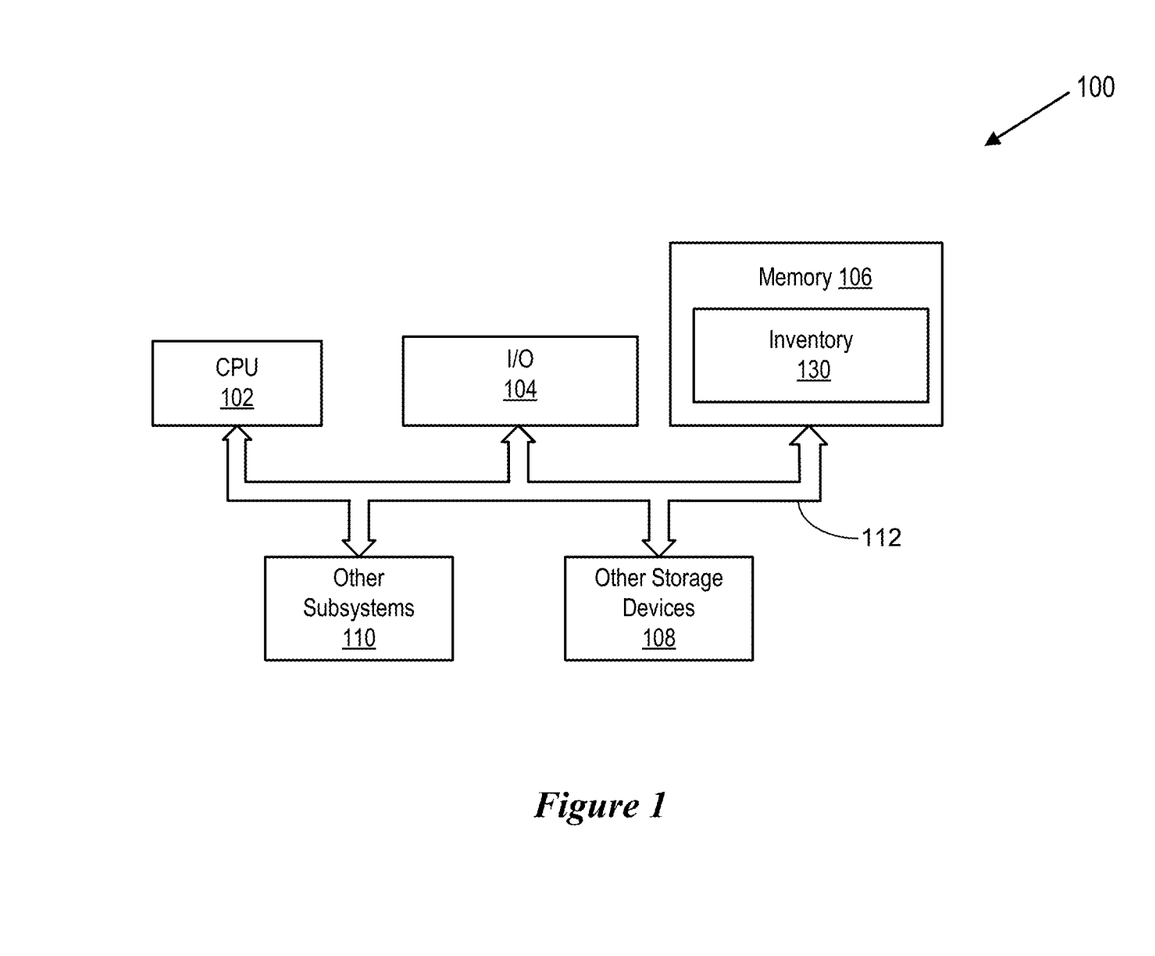
FIG. 1 shows s a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, memory 106, and various other subsystems 108. The information handling system 100 likewise includes other storage devices 110. The components of the information handling system are interconnected via one or more buses 112.

In certain embodiments, such as when the information handling system corresponds to a host or server type information handling system, the memory 106 stores an inventory location system 130 which includes instructions executable by the processor 102. In certain embodiments, the host includes a service processor and the inventory location system instructions are executed by the service processor. The inventory location system 130 enables management controller awareness and cooperation between nodes within an IT environment to provide a secure, optional and altruistic ability to identify and/or locate environment inventory. Such a system minimizes a management controller compute overhead, network burden via an optimized search space and provides an opportunistic scheduled time for response.

Figure 2:
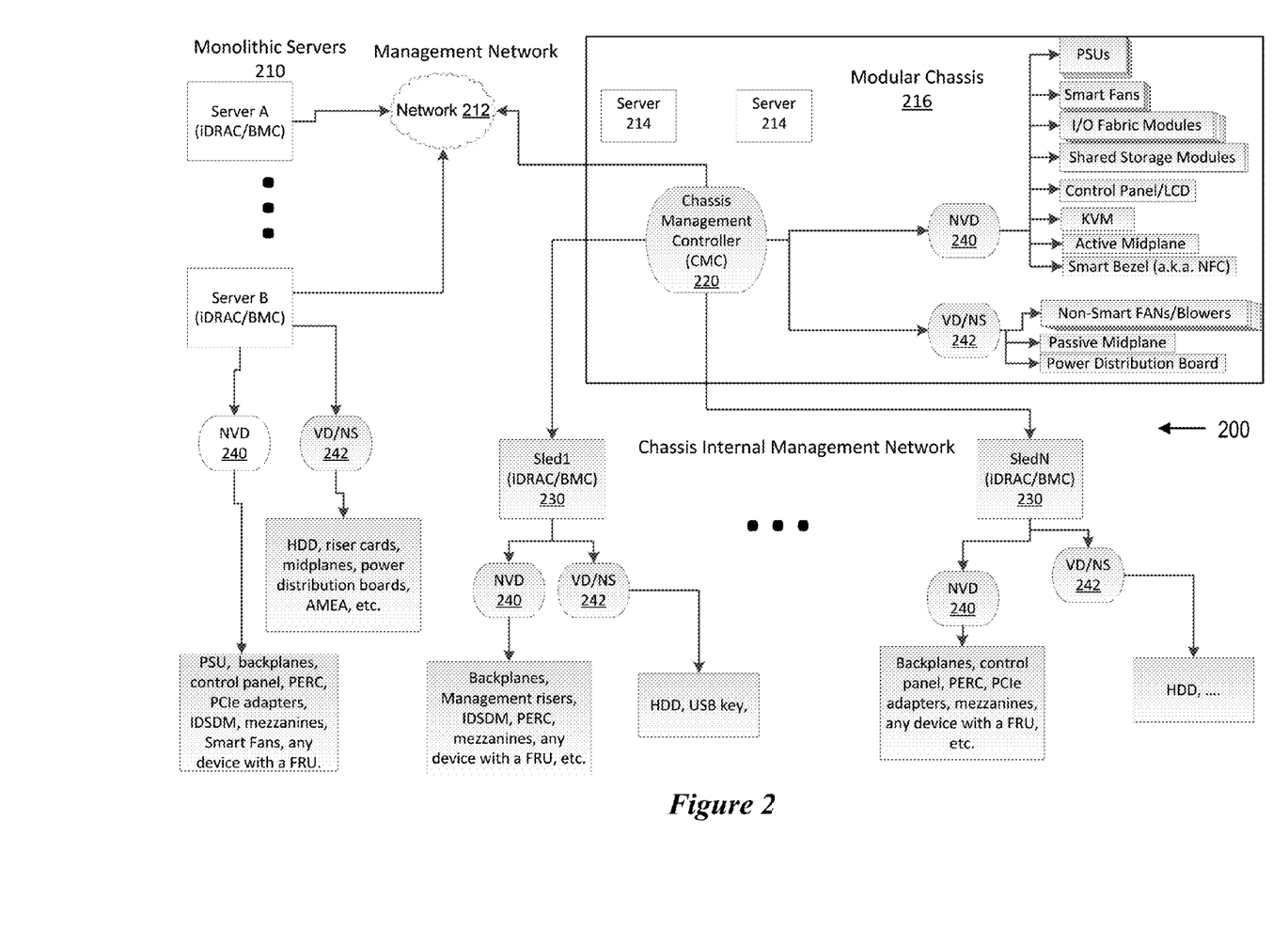
FIG. 2 shows a block diagram of a physical view of an enterprise environment which includes a system for performing distributed enterprise equipment inventory operations.

Referring to FIG. 2, a block diagram of a physical view of an example enterprise environment 200 which includes a system for performing distributed enterprise equipment inventory operations is shown. More specifically, in certain embodiments the enterprise environment includes a plurality of monolithic server type information handling systems 210 which are coupled to a network 212 (e.g., a management network). The enterprise environment 200 further includes a plurality of modular server type information handling systems 214 which are included within a modular chassis 216. A management controller 220, such as a chassis management controller, is also coupled to the network 212. In certain embodiments, the management controller 220 is also included within the modular chassis 216.

In certain embodiments, the management controller 220 is also coupled to one or a plurality of sleds 230 (sled1-sledN). Each sled 230 comprises a chassis as well as a plurality of server type information handling systems. The chassis allows the server type information handling systems to share power supplies and fans across a plurality of server nodes. Also, in certain embodiments, the server type information handling systems within each sled 230 are interchangeable and are networked using top of rack or end of row switches.

Each server type information handling system 210, 212 includes devices which include non-volatile storage on the device 240 as well as devices which include either volatile storage on the device or no local storage on the device 242. Examples of devices which include non-volatile storage on the device 240 include power supply units (PSUs), smart fans, input/output (I/O) fabric modules, shared storage modules (such as a RAID controller such as a Poweredge RAID Controller (PERC)), control panels (such as LCD type control panels), keyboard, video & mouse (KVM) controllers, active midplanes, smart bezels (e.g., which include near field communication (NFC)), etc. Examples of devices which include either volatile storage on the device or no local storage on the device 242 include non-smart fans (such as blowers), passive midplanes, power distribution modules, etc. With devices which include non-volatile storage current and past chassis information may be stored within the non-volatile memory whereas with devices which include either volatile storage on the device or no local storage on the device use look ups (such as within a lifecycle log file) via a device identifier such as a device serial number to determine a device location.

Additionally, each sled 230 includes devices which include non-volatile storage on the device 240 as well as devices which include either volatile storage on the device or no local storage on the device 242. Examples of devices which include non-volatile storage on the device 240 include power supply units (PSUs), smart fans, input/output (I/O) fabric modules, shared storage modules (such as a RAID controller such as a Poweredge RAID Controller (PERC)), control panels (such as LCD type control panels), keyboard, video & mouse (KVM) controllers, active midplanes, smart bezels (i.e., which include NFC), etc. Examples of devices which include either volatile storage on the device or no local storage on the device 242 include non-smart fans (such as blowers), passive midplanes, power distribution modules, etc.

There are a plurality of inventory movement examples for which the inventory system is used. For example, a PSU may be moved from a server 212 contained within a modular chassis 216 to a monolithic server 210. Also, a PERC may be moved from a server contained within a sled (e.g., sled1) to a monolithic server 210 (e.g., server B). Also for example, a hard disk drive HDD may be moved from a first sled location (e.g., chassis 1, sled 1) to another sled location (e.g., chassis 1, sled N). It will be appreciated that many other inventory movements are contemplated.

When performing a location (i.e., a lost and found) procedure with chassis or baseboard management controllers, the management controllers 220 may be configured to use broadcast packets for the below traffic or may be configured in a group (or federation) of management controllers 220 on the same local area network (LAN) or virtual local area network (VLAN). When configured as a group, the management controllers 20 may communicate with each other by using packets such as either unicast packets or broadcast packets to each peer. In certain embodiments, when performing a location procedure within a modular chasses for which an internal L2 switch has peer-to-peer traffic enabled, then an internal management network (such as an internal VLAN) is used to communicate between the management controllers 220.

During an inventory process, devices register inventory to a system. More specifically, the system logs inventory details for each device in a lifecycle log contained within a management controller 220. The inventory details can include module type information, part number information, serial number information and slot number information. The system also logs inventory details for each device having access to non-volatile memory. Specifically, the system accesses a current chassis service tag identification information and compares this current chassis service tag identification information with the last known location of the device (based upon the service tag). If the location is different, then the management controller 220 moves the current service tag identification information to a last known service tag identification information and then overwrites the current service tag identification information to identify the new location of the device. This information is stored within the non-volatile memory of the device.

One example of a device for which the inventory process applies includes power supply units which include a non-volatile memory such as PSUs which include OEM use space in a PMBUS controller. Other examples for which the inventory process applies includes Network daughter cards, mezzanine cards such as in blade fabrics or PCIe cards, control panels, Backplanes, smart fans PCIe adapters that support Real-time comprehensive embedded management (e.g., a management component transport protocol (MCTP) over PCIe, a network controller sideband interface (NC-SI) or a system management bus (SMBUS) sideband access). In certain embodiments, some or all of these devices include field replaceable unit (FRU) fields contained within spare EEPROM locations.

Devices with no memory or volatile only memory are identified as inventory types with no location or volatile-only locations. For these types of devices, the lifecycle log is used as reference. Examples of these types of devices include certain hard disk drives as well as passive riser cards. Note all or most of these types of devices may also be configured to be non-volatile devices.

Figure 3A:
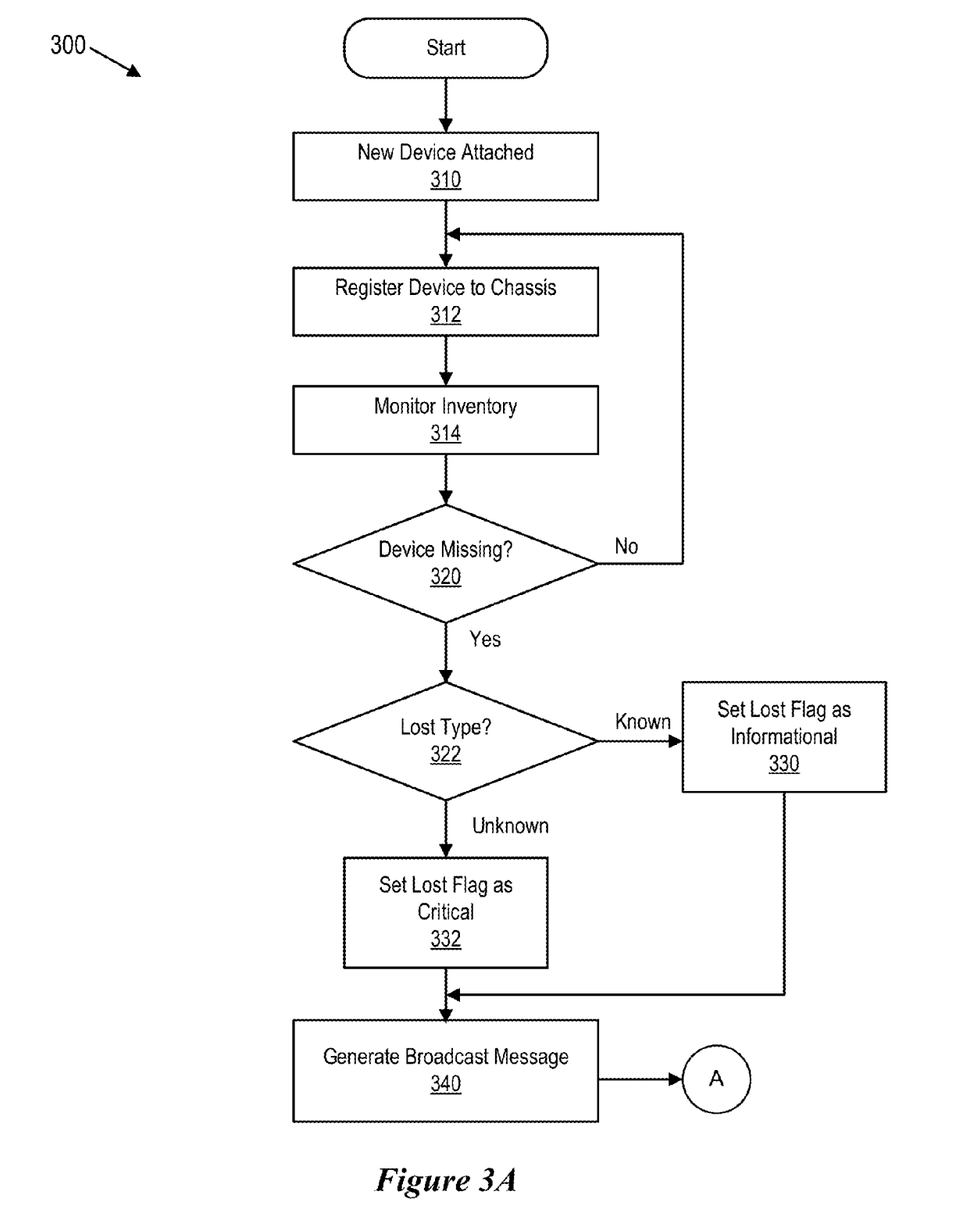
FIGS. 3A and 3B, generally referred to as FIG. 3, show a flow chart of the operation of a system for performing distributed enterprise equipment inventory operations.
Figure 3B:
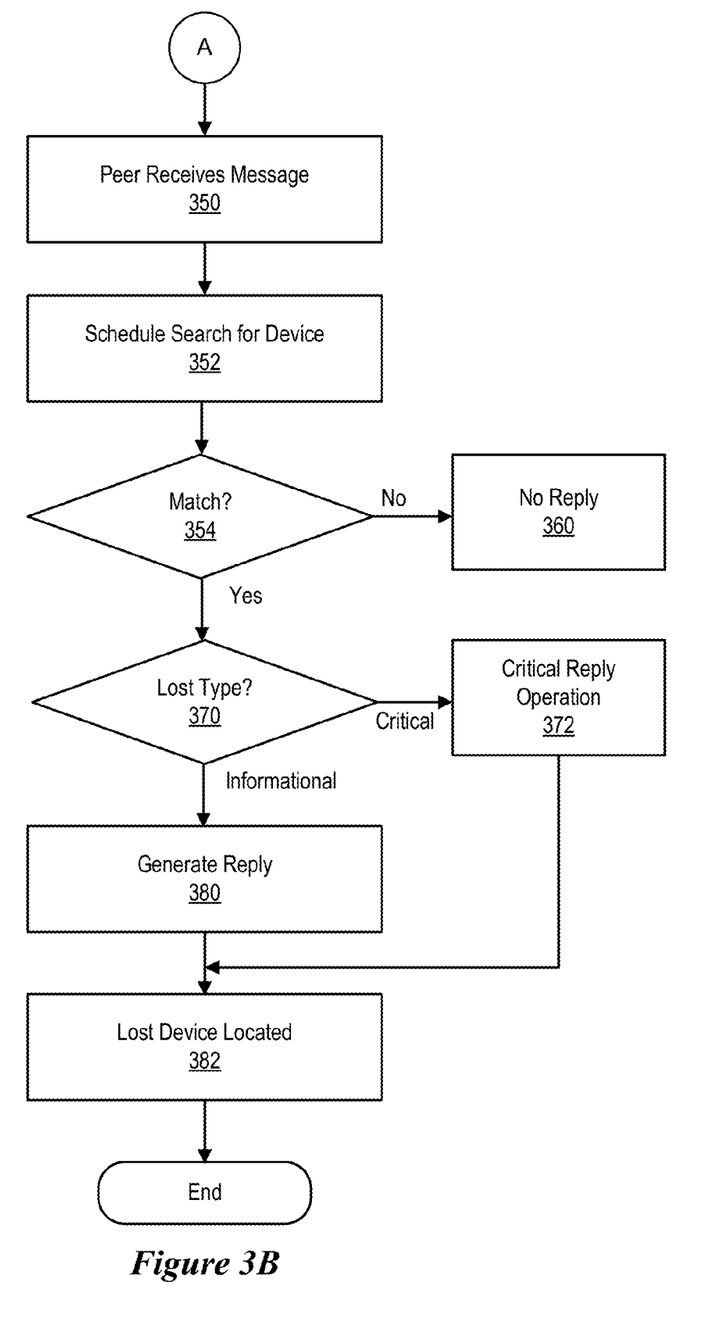

Referring to FIGS. 3A and 3B, a flow chart of the operation of a system for performing distributed enterprise equipment inventory operations is shown.

When performing an inventory location operation, an inventory locator broadcast is generated (e.g., a user initiated lost broadcast). The inventory locator broadcast includes information about the device to be located. This information can include source information, inventory detail information, time information as well as importance information. The source information can include a service tag for the source of the inventory locator broadcast, an internet protocol (IP) address for the source and/or an administrator's contact information. The inventory detail information can include a device part name, a device serial number, inventory identification information (e.g., a part identifier (PPID)). Inventory identification information identifies system components as they are integrated into an information handling system build. This identification enables fast referencing of the component and its history should there be failures (e.g., within a customer base). Each inventory label is unique to a particular inventory device. The importance information can include a critical importance flag as well as other information identifying an assigned importance for locating the device.

When receiving the inventory broadcast, peers generate an indication of receipt of the inventory broadcast. This indication of receipt includes an indication of whether the inventory location operation is enabled within the management controller of the peer. The peer then schedules a search for the device to be located. This search include searching a lifecycle log of the peer to determine whether a unique device identifier for the device to be located is present within the lifecycle log of the peer. In certain embodiments, the efficiency of the search may be improved by only searching back to a predetermined time (e.g., a time related to the time information contained within the inventory locator broadcast). Also, in certain embodiments, this predetermined time may include a margin to accommodate for real time clock drift between the requesting system and the receiving system.

If when performing the search within the peer the device is located, then the peer so indicates the location. Specifically, a flag may be set indicating the location of the device. The peer may also respond to the source of the request with the chassis service tag and/or location of the located device, with inventory detail about the located device. The peer can also provide information relating to the time of arrival of the device (i.e., when the device was installed on the peer). Additionally, if the inventory broadcast included a critical importance indication, then the peer may also log to the system event log (SEL) and include a query regarding whether the located device should be returned to its original location. This original location may be based upon a last chassis service tag which is stored within the non-volatile memory of the device. A response to the query can further include a verification that the requestor was indeed in previous possession of the device. In certain embodiments, the verification can include the service tag of the device, the IP address of the device or the contact information of the previous owner. The source that receives a response may be configured to perform at least one of a plurality of configurable inventory operations. These configurable inventory operations include logging into the SEL and/or the lifecycle controller to log a message (such as "located article X in system Y"). The management controller may then be configured to generate a communication such as an email communication, a short message service (SMS) type communication, a simple network management protocol (SNMP) trap type of communication, etc. to the administrator.

More specifically, the system 300 for performing distributed enterprise equipment inventory operations begins operation at step 310 when a new device is attached somewhere within the environment 200 (e.g., the device is attached to a server). Next, at step 312, the system 300 registers the device to the chassis and the chassis is linked to the device (if the device includes non-volatile storage). During the registration process a type of device determination operation is performed and the current and previous possessor information is updated. Next at step 314, the system 300 monitors the inventory. The system 300 then determines whether a device is missing at step 320. As long as there are no devices missing then the operation continues to monitor the inventory at step 314. In certain embodiments, this determination may be made by a user who then provides a lost indication to the system.

If a determination is made that a device is missing, then the system 300 accesses information relating to the device to make a lost type determination. In certain embodiments, the lost type may be either known or unknown. A known lost type indicates that the missing device is intentional (i.e., the device location was changed intentionally). A missing device lost type which is intentional indicates that a system administrator changed the location according to procedures which would update the status of the device. An unknown lost type indicates that the missing device is unintentional (i.e., the device location was changed unintentionally). A missing device lost type which is unintentional indicates that the location of the device is not known as the change in location was not performed according to procedures which would update the status of the device. When the lost type is known, then the system 300 sets a lost flag indication as informational at step 330. When the lost type is unknown, then the system 300 sets a lost flag indication as critical at step 332.

In either case, the system 300 generates a broadcast message at step 340. In certain embodiments, a management controller 220 which is interacting with the system 300 generates the broadcast message. Also, in certain embodiments, the broadcast massage may be to a specific group of entities. The broadcast message includes information relating to the missing device such as a device identifier, a previous location of the device and contact information of the originator of the determination that the device is missing.

Next, at step 350, at least one peer receives the broadcast message. The peer then schedules a search for the device which is identified as missing in the broadcast message at step 352. Next, at step 354, the system determines whether a match for the missing device is identified. If a match is not identified, then the system provides no reply to the broadcast message at step 360. If there is a match, then the system determines the lost type at step 370. If the lost type is identified as critical, then the system performs a critical reply operation at step 372. In certain embodiments, the critical reply operation includes one or more steps such as generating a reply indicating that the peer performing the search possesses the device for which the broadcast message was generated, alerting a user to move the device to a certain location (e.g., to return the device to its previous location), to change a health status indicator for the peer (e.g., to set a health status indicator to amber). Also, in certain embodiments, to return a health status indicator to a healthy indication (e.g., a health status indicator of blue), at least one of a plurality of operations are performed. These operations may include the device being physically removed from the peer, a user providing an acknowledgement of the new location of the device, or a user disabling the inventory location operation for the device.

If the lost type is informational, then the system generates a reply at step 380 indicating that the peer performing the search possesses the device for which the broadcast message was generated. After the critical reply operation step 372 and the generate reply step 380, the source (and/or the original device owner) receives the replay from the peer and provides an acknowledgement of the receipt. Thus the missing device is located and the inventory location operation completes.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for locating inventory within an enterprise environment, the enterprise environment comprising a plurality of information handling systems, at least one of the plurality of information handling systems comprising a monolithic server type information handling system, at least one of the plurality of information handling systems comprising a modular chassis type information handling system, at least one of the plurality of information handling systems comprising a sled, the sled comprising a chassis and a server type information handling system, comprising:

generating, from a source, a broadcast message requesting location of a device within one of the monolithic server type information handling system, the modular chassis type information handling system and the sled of the enterprise environment, the broadcast message indicating whether the device corresponds to a particular lost type, the particular lost type indicating a severity of loss of the device;

performing a search in a peer of the device within the enterprise environment to determine whether the device is present in the peer;

generating a reply to the source when the device is present in the peer; and wherein the device comprises a non-volatile memory, the non-volatile memory storing information relating to a history rotation scheme, the history rotation scheme comprising information regarding a current location of the device and information regarding a most recent different location; and the source comprises a management controller, the management controller comprising an ability to receive and process a lost request, to limit a search to the timeframe since lost, to schedule a current inventory and past inventory lifecycle log search, to determine a match via looking at current and past possession and correlating the possession with a previous owner's information and on a hit to react based on severity of the hit.

2. The method of claim 1, wherein:
the search comprises performing a search of a Lifecycle log of the peer.

3. The method of claim 1, further comprising:
including information regarding a time frame of when the device was lost within the broadcast message.

4. The method of claim 1, wherein:
the management controller comprises at least one of a baseboard management controller and a chassis management controller.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

generating, from a source, a broadcast message requesting location of a device within the enterprise environment, the enterprise environment comprising a plurality of information handling systems, at least one of the plurality of information handling systems comprising a monolithic server type information handling system, at least one of the plurality of information handling systems comprising a modular chassis type information handling system, at least one of the plurality of information handling systems comprising a sled, the sled comprising a chassis and a server type information handling system, the device being included within one of the monolithic server type information handling system, the modular chassis type information handling system and the sled of the enterprise environment, the broadcast message indicating whether the device corresponds to a particular lost type, the particular lost type indicating a severity of loss of the device;

performing a search in a peer of the device within the enterprise environment to determine whether the device is present in the peer;

generating a reply to the source when the device is present in the peer; and wherein the device comprises a non-volatile memory, the non-volatile memory storing information relating to a history rotation scheme, the history rotation scheme comprising information regarding a current location of the device and information regarding a most recent different location; and the source comprises a management controller, the management controller comprising an ability to receive and process a lost request, to limit a search to the timeframe since lost, to schedule a current inventory and past inventory lifecycle log search, to determine a match via looking at current and past possession and correlating the possession with a previous owner's information and on a hit to react based on severity of the hit.

6. The system of claim 5, wherein:
the search comprises performing a search of a Lifecycle log of the peer.

7. The system of claim 5, wherein the computer program code further comprises instructions for:
including information regarding a time frame of when the device was lost within the broadcast message.

8. The system of claim 5, wherein:
the management controller comprises at least one of a baseboard management controller and a chassis management controller.

9. A non-transitory, computer-readable storage medium embodying computer program code, the computer program code comprising computer executable instructions configured for:

generating, from a source, a broadcast message requesting location of a device within the enterprise environment, the enterprise environment comprising a plurality of information handling systems, at least one of the plurality of information handling systems comprising a monolithic server type information handling system, at least one of the plurality of information handling systems comprising a modular chassis type information handling system, at least one of the plurality of information handling systems comprising a sled, the sled comprising a chassis and a server type information handling system, the device being included within one of the monolithic server type information handling system, the modular chassis type information handling system and the sled of the enterprise environment, the broadcast message indicating whether the device corresponds to a particular lost type, the particular lost type indicating a severity of loss of the device;

performing a search in a peer of the device within the enterprise environment to determine whether the device is present in the peer;

generating a reply to the source when the device is present in the peer; and wherein the device comprises a non-volatile memory, the non-volatile memory storing information relating to a history rotation scheme, the history rotation scheme comprising information regarding a current location of the device and information regarding a most recent different location; and the source comprises a management controller, the management controller comprising an ability to receive and process a lost request, to limit a search to the timeframe since lost, to schedule a current inventory and past inventory lifecycle log search, to determine a match via looking at current and past possession and correlating the possession with a previous owner's information and on a hit to react based on severity of the hit.

10. The non-transitory, computer-readable storage medium of claim 9, wherein:

the search comprises performing a search of a lifecycle log of the peer.

11. The non-transitory, computer-readable storage medium of claim 9, wherein the computer program code further comprises instructions for:

including information regarding a time frame of when the device was lost within the broadcast message.

12. The non-transitory, computer-readable storage medium of claim 9, wherein:

the management controller comprises at least one of a baseboard management controller and a chassis management controller.

13. A computer-implementable method for locating inventory within an enterprise environment, the enterprise environment comprising a plurality of information handling systems, at least one of the plurality of information handling systems comprising a monolithic server type information handling system, at least one of the plurality of information handling systems comprising a modular chassis type information handling system, at least one of the plurality of information handling systems comprising a sled, the sled comprising a chassis and a server type information handling system, comprising:

generating, from a source, a broadcast message requesting location of a first device within one of the monolithic server type information handling system, the modular chassis type information handling system and the sled of the enterprise environment, the broadcast message indicating whether the device corresponds to a particular lost type, the particular lost type indicating a severity of loss of the device;

performing a search in a peer of the first device within the enterprise environment to determine whether the first device is present in the peer, the search being based upon chassis information stored within a non-volatile memory of the first device;

generating a reply to the source when the first device is present in the peer;

generating, from a source, a broadcast message requesting location of a second device within one of the monolithic server type information handling system, the modular chassis type information handling system and the sled of the enterprise environment;

performing a search in a peer of the second device within the enterprise environment to determine whether the second device is present in the peer;

generating a reply to the source when the second device is present in the peer; and wherein the non-volatile memory of the first device stores information relating to a history rotation scheme, the history rotation scheme comprising information regarding a current location of the device and information regarding a most recent different location;

the second device comprises at least one of a volatile memory and no local storage, the second device comprising a device identifier, the search of the peer searching for the device identifier of the second device; and the source comprises a management controller, the management controller comprising an ability to receive and process a lost request, to limit a search to the timeframe since lost, to schedule a current inventory and past inventory lifecycle log search, to determine a match via looking at current and past possession and correlating the possession with a previous owner's information and on a hit to react based on severity of the hit.

14. The method of claim 13, wherein:

the management controller comprises at least one of a baseboard management controller and a chassis management controller.

* * * * *